Sept. 29, 1953 C. W. VOGT 2,653,752
BAG ASSEMBLY
Filed Sept. 30, 1948
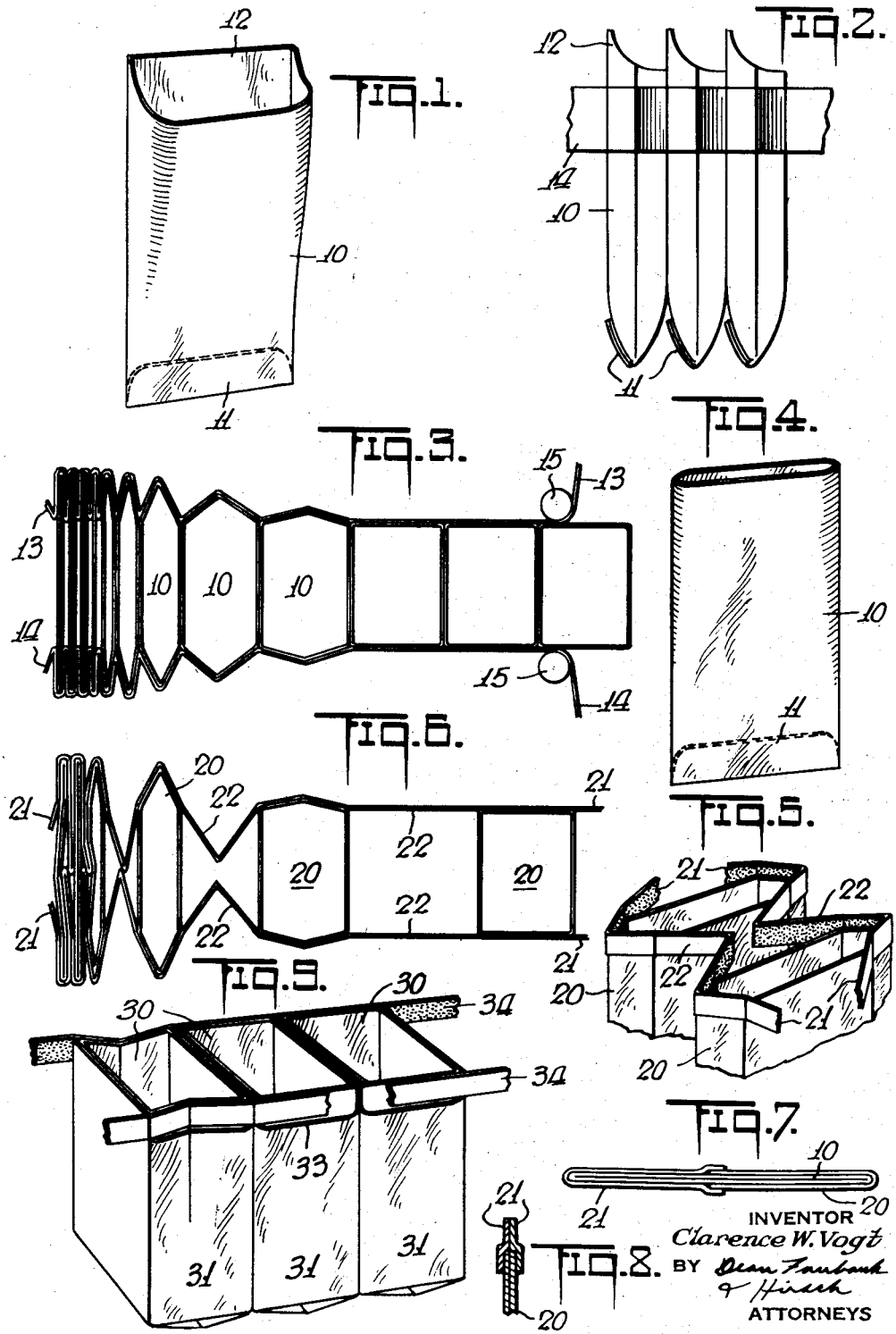
INVENTOR
Clarence W. Vogt
BY
ATTORNEYS Patented Sept. 29, 1953

2,653,752

UNITED STATES PATENT OFFICE 2,653,752

BAG ASSEMBLY

Clarence W. Vogt, Norwalk, Conn.

Application September 30, 1948, Serial No. 51,946

6 Claims. (Cl. 229—56)

This invention relates to bags which may be employed for the packaging of a wide variety of liquid, plastic or solid materials for shipment, storage or sale, and relates more particularly to means whereby the bags may be fed in succession in an upright position and in a generally horizontal direction to and from a filling mechanism, and thereafter closed and sealed.

As an important feature of my invention the bags are connected together in a chain by two or more tapes which serve as the means for advancing the bags, and also as the means for opening the bags as they approach the filling nozzle or other filling apparatus. As a further feature, the tapes are of such a character that they may, in some cases, also serve as the means for sealing the bags after being filled, and with or without detachment from the bags.

The bags per se may be of a wide variety of known forms or constructions, including the pillowcase type, the rectangular bottom type with side panels connected by infolded side walls, and a wide variety of other forms. The bags may be of any suitable sheet material, depending upon the character of the liquid, plastic, pulverulent, granular or other type of goods to be packaged therein.

Preferably the bags are either formed of or lined with a non-porous material unaffected by liquids, whereby the passage of moisture, liquids, air, or other fluids into or out of the bags is prevented after the latter have been filled and sealed, and such material may be thermoplastic to facilitate heat and pressure sealing.

The bag may be made of laminated or coated sheet material, the inner layers or coating of which are of such material that when said inner layers are superposed and pressed together under heat, they will weld, vulcanize or hermetically unite. As an example of such material, I may employ a type of thin, flexible, transparent, slightly elastic impervious material sold by Goodyear under the name "Pliofilm," and made from chlorinated rubber compound. This material may be readily vulcanized or sealed at a temperature of approximately 115° C., so that the overlapping sections thereof may be vulcanized or sealed together by the application of heat and pressure, even though the surfaces have been previously wetted by contact with liquids or moisture-carrying plastic material. Another material which may be satisfactorily used in some constructions and for some material is a moisture-proof cellulosic material of the type sold by Du Point under the trade name "Heat Sealing Cellophane." It may be a polyvinylidene sold by Dow Chemical under the trade name "Saran," or polyethylene such as sold by Plax Corp. and Visking Corp. So far as some aspects of the invention are concerned, a thin sheet material having a waterproof coating or layer such as that sold under the trade name "Koroseal" may also be used. Also, so far as certain aspects of the invention are concerned, other materials may be used, which may be fabricated into a casing by the use of adhesive or solvents to sealably secure adjacent surfaces of said material together.

Where the wall is laminated, the outer layer may be of paper, tin foil, cloth, or other common sheet material, and the inner layer may be of any heat or pressure sealable materials such as those above mentioned.

As an important feature, the bags are connected together in series by tapes which serve to feed along a single row of bags, and in a direction at right angles to the planes of the flat collapsed bags. The tapes of a stack of collapsed bags are folded back and forth, and are permanently or detachably connected to the bags at or adjacent to the open ends, and in such a manner that as the tapes are straightened out they automatically open up the bags. The sections of the tapes which are directly attached to the bags may be permanently affixed, and the tape sections employed in the sealing of the bags after filling, or the tapes may be detachably connected to the bags and completely removed therefrom after the bags are filled, and after removal may be reused in making further chains of bags. In the stack of collapsed bags the tapes are folded zigzag to form accordion pleats, and the straightening out of the tapes acts to open the bags.

If the bags be of the infolded side wall type, the tapes may be folded into or placed in the folds of the side walls to pull said side walls outwardly and open the bags for filling, and if the bags be of the pillowcase type, the tapes may be folded around the vertical edges of each flat bag so that in straightening the tapes these edges are moved inwardly as the mid-portions of the flat side walls move apart to thus open the bags. The tapes may be so connected that when they are straightened out, the bags are opened, but may remain in closely juxtaposed positions or may be spaced apart.

The tapes may be adjacent to but below the open upper ends of the bags, and may be completely removed from the bags after filling, or each tape may extend above the open end of the bags and the tapes cut in two between successive bags, and the portion of the tape remaining on the bag may serve as the means for sealing the bag after closing.

The type of adhesive employed in securing the tapes to the bags will vary depending upon the type of the bags and different ultimate uses of the tape. If the tapes serve merely as the advancing and opening means for the bags the adhesive may be of the self-stick or pressure-sensitive type, so that the tapes may be peeled free from the bags and reused, or the adhesive may be such that the tapes cannot be readily pulled off the bags, and after cutting in two may be sealed together above the filling ends of the bags to hold the latter in tightly closed condition.

Most ordinary types of paper bags are closed at the bottom by folding over the end and pasting it down, or by other type of folding which results in flat and collapsed bags thicker at the bottom end than at the top. Therefore, in packing such bags they are usually divided into groups, each containing a predetermined number of bags, and the bags are packaged or packed by reversing end for end the position of each alternate group or bundle, so that there will be as many thick bag ends at each end of the stack as there are thinner bag ends. Such packing of empty bags necessitates the manual reversing end for end of alternate bundles, and when the bags are to be used, each alternate bundle must again be reversed end for end before the bags are fed into a filling machine.

A further important advantage of my invention is that it permits the empty bags to be stacked or packaged without end for end reversal, because the connecting tapes at the tops of the bags provide the same increase in thickness as does the folding over and closing of the bottoms. Thus, neither in the packing of empty bags for storage or shipment, nor in the delivery of empty bags to filling machines, is it necessary to reverse end for end any of the groups of bags.

Merely as illustrative of my invention I have shown several different forms in the accompanying drawings, in which Fig. 1 is a perspective view of a pillowcase type of bag with a closure flap.

Fig. 2 is a side elevation of a series of bags such as shown in Fig. 1, connected by tapes and partally opened.

Fig. 3 is a top plan of a chain of bags, those at the left hand end being collapsed and those at the right hand end being fully opened.

Fig. 4 is a perspective view of another type of pillowcase bag.

Fig. 5 is a perspective view of a chain of bags where the tapes are employed for sealing, and without removal from the bags.

Fig. 6 is a view similar to Fig. 3, but showing the bags of Figs. 4 and 5 spaced apart when opened, rather than contiguous as in Fig. 3.

Fig. 7 is an end view of a closed bag of the type shown in Figs. 4, 5 and 6, but before the upper free edges of the tapes are sealed together above the upper ends of the side walls of the bags.

Fig. 8 is a vertical section through the upper end of the bag shown in Fig. 7, after sealing, and Fig. 9 is a perspective view of a chain of bags of a further type, and in which the bags are lined and have infolded rather than outfolded side walls connecting the front and rear panels.

In the forms illustrated in Figs. 2 and 3 the invention may be employed in connection with a known type of bag such as shown in Fig. 1, or the type shown in Fig. 4. In both types of bags the body portion 10 is formed of a tube of sheet material with one end of both the front and back walls folded over as a flap 11 and sealed to form the bottom of the bag, thus forming a portion of four thicknesses. In the form shown in Fig. 1, one panel is somewhat longer than the other to form a flap 12 at the open end, which may be folded over with or without sealing, to close the mouth of the bag after filling, and in Fig. 4 this flap is omitted.

In employing my invention in connection with this type of bag there are provided a pair of tapes 13 and 14 which may be of paper or other suitable material, and each tape is coated on one surface with an adhesive which is preferably of the self-stick or pressure-activated type, and which has high shear strength but can be easily peeled from the surface to which it may be attached. These two tapes are folded transversely to form accordion pleats, and each pleat extends around and encloses a vertical edge of the collapsed bag.

The tape may be positioned entirely below the upper open ends of the bags, or with its upper edge flush with or disposed below such ends. It may hold the bags in closely juxtaposed positions or spaced apart. If the bags are provided with flaps 12, as shown in Fig. 1, these strips are preferably attached to the bags at or slightly below the opposite or shorter wall of the bags. Thus the flattened bags may be stacked with the tape extending in a short distance between successive bags, so that each bag adjacent to its open end will be formed of four layers, namely the two layers of a pleat of the tape and the two opposite walls of the bag, and the total thickness will thus substantially equal the total thickness of the bottom of the bag where the two walls are folded over to close the bottom 11 and provide four thicknesses.

The fold sections of the pleats of the tapes may be of a length substantially equal to one-eighth of the perimeter of the bags, so that when the tapes are pulled out straight from the folded condition shown at the left hand end of Fig. 3 to the position shown at the right hand end of said figure, the bag mouths will be substantially square, and the side panels of the bags closely juxtaposed. By making the pleats of the tape shorter, the bags when open will be rectangular, but still closely juxtaposed.

In the filling of bags of the type shown, a stack of bags in collapsed form, as shown at the left hand portion of Fig. 2, is delivered to the bag filling machine, and the ends of the tapes 13 and 14 are pulled to progressively open the bags, as shown at the middle portion of Fig. 3, and as the bags become filled the outer edge portions are pulled in to convert the bag to substantially rectangular form. After filling, the tapes may pass around rollers 15 and be pulled away from each other so that as each filled bag passes between the two rollers the tapes are pulled entirely free from the bags and may be reused in making up a new chain. Thereafter the upper edge of the bag may be collapsed, and if the bag has a flap 12, this may be folded over to close the bag. The flap may have adhesive applied thereto, so that upon closing, the bag will be sealed. The bags may be closed and/or sealed in any other suitable manner.

In the construction shown in Figs. 5 and 6, the bags 20 may be of the same type as shown in Fig. 4, but the tape employed for feeding the bags through the filling machine and for opening them up, may be employed as the means for sealing the open ends. The bags 20 at their open ends are connected together by tapes 21 which are folded to zigzag form, and one edge portion is sealed to the outer surface of the bag for a short distance in from each of the two opposite edges of the mouth of the collapsed bag. The tapes are of such length and of such width that a pleat 22 of the tape extends inwardly between adjacent bags without being sealed thereto, and the upper edges of the tapes are above the upper edges of the side walls of the bags, as shown in Fig. 5. In this form the walls of the bag need not be of heat-sealable material or be directly sealed together at the mouth.

When in stacked position the bags are flat, as shown at the left end portion of Fig 6. Upon pulling the tapes the bags are separated from each other, and when the tapes are substantially straightened out, as shown at the right hand portion of Fig. 6, each open bag will be substantially rectangular in form at its upper end, and the bags will be spaced apart and may be readily filled. Thereafter, each tape is cut in two at a point midway between adjacent bags, and preferably at the inner end of each infolded pleat, and the mouth of the bag is collapsed to close it. The edge portions of the tapes which extend above the open end of the bag are then directly sealed together at opposite sides. The ends of one tape will preferably overlap those of the other, so that the bag is completely sealed by the portion of the tape above the end of the bag, as shown in Fig. 8.

As a further embodiment of my invention I may employ bags enclosed in outer laminations or cartons, as shown in my prior Patent 2,234,065, issued March 4, 1941. The bag 30, which may be of Pliofilm, heat sealing cellophane, or other analogous material, is enclosed in a carton or outer casing 31 or lamination of stiff non-sealing material, and which is provided with slots 33 or cut-away portions through which the outer surfaces of the inner wall of the bag presented in the infolds may be sealed together, as well as to the side panels which latter are directly sealed together between the infolds, as more fully described in my Patent 2,234,065 above referred to.

In using double-walled bags of that type in carrying out the present invention, the bags are connected together by tapes 34 which have pleats extending into the infolds of the collapsed bags, and in the area where the inner lamination or bag proper is exposed through slots or at cutaway portions of the outer lamination or carton. The tapes are secured to the inner lamination or bag proper by a type of adhesive which permits the tapes to be readily pulled free. By pulling endwise on the tapes the infolded portions of the bag are pulled out from collapsed form, so that the bag presents a rectangular open end for filling. After the bags have been advanced by the tapes and have been filled, the tapes are pulled free from the bag, leaving the exposed areas of the bag at the slots or openings 33 of the outer wall exposed, and the upper ends of the bags may be closed and sealed as disclosed in my patent above referred to.

Various other types of bags may be employed, but as an essential feature there are employed the two tapes which act to open up the bags, advance them to and past the filling station, and thereafter the bags are closed and sealed either by means of the tape remaining adhering to the inner bag or completely removed and the mouth of the bag heat-sealed in closed position.

In each of the forms illustrated, each tape has adhesive on one surface only, is accordion pleated to form zigzag folds, and is secured to two wall portions of the bag which are integral or connected along a fold line. Thus, as the tapes are straightened or pulled toward a straight line, said wall portions come to or toward a single plane, and as a result the bag is opened for filling.

In the form shown in Fig. 5, additional means may be provided for further insuring the tight sealing of the bag. A sheet of material may have approximately its upper third adhesively secured to one of the panels of the bag with an edge portion extending a quarter of an inch or thereabouts above the edge of the panel. The lower two-thirds will be free of the panel and adhesively coated on the outer surface. After filling the bag and closing the mouth thereof, this sheet of material may be folded up and over the bag mouth and secured to the opposite panel. The sheet may be of somewhat greater length than the width of the panel so that opposite portions of the sheet may be sealed together beyond the fold lines at the edges of the side walls of the bag.

Having thus described my invention what I claim as new and desire to secure by Letters Patent is:

1. A bundle of flat distensible bags, each having a pair of opposed side walls and a pair of connecting walls infolded between said first mentioned pair, the infolds of one connecting wall being spaced from the folds of the other, all of said walls being formed with an inner layer of heat-sealable material and an outer protecting layer, said protecting layer extending the full length of said side walls and being cut away adjacent to one of the ends of said infolded walls to permit direct sealing contact between opposite portions of the infolded walls, and a pair of accordion pleated tapes at opposite sides of said bundle, each having folds extending into the infolds of successive bags of said bundle and secured to said inner layer in the area where said side walls are cut away.

2. A bundle of laminated bags each formed of sheet material comprising an inner layer of heat-sealable material and an outer layer forming a protective coating therefor, each bag comprising opposed side walls and infolded walls connecting said side walls, all of said walls being heat-sealed together at one end of the bag to close the bottom, the infolded portions of said protecting layer being cut away at the sealing area at the open end of the bag to permit direct sealing contact between the opposite portions of the infolded walls, and a pair of tapes each folded zigzag and having portions secured to said inner layer in the area where the protecting layer is cut away.

3. A bag chain, comprising a plurality of bags, each bag having open and closed opposite ends, front and back walls and folds at the lateral sides of said bags, all of said bags being disposed in juxtaposed relation with the back wall of each bag, except the last bag, adjacent to and parallel with the front wall of an adjacent bag, said bags being in collapsed relationship to form a stack of bags, a pair of tapes extending along opposite lateral sides of said bags in said stack and being folded in zigzag form to conform to the folds of said bags and being bonded to the folds and portions of said bags a short distance on each side of said folds, said tapes acting, when straightened, to straighten out the folds in the said bags and the portions to which said tapes are bonded and move the front and back walls of said bags apart with the side portions substantially parallel and the front and back walls substantially parallel and perpendicular to said side portions.

4. The bag chain set forth in claim 3 in which portions of said tapes of substantial length are interposed between and free from attachment to adjacent bags to enable said bags to be moved into spaced apart relation when said tapes are straightened.

5. The bag chain set forth in claim 3 in which said tapes extend substantially directly from one bag to another to maintain the front and back walls of adjacent bags substantially in engagement when said tapes are straightened.

6. A bag chain, comprising a plurality of bags, each bag having open and closed opposite ends, front and back walls and gussets at the lateral sides of said bags, each gusset having an inwardly directed fold and gusset panels on opposite sides thereof joined to the front and back walls by spaced apart, outwardly directed folds, all of said bags being disposed in juxtaposed relationship with the back wall of each bag, except the last bag, adjacent to and parallel with the front wall of an adjacent bag, said bags being in collapsed relationship to form a stack of bags, a pair of tapes extending along opposite lateral sides of said bags in said stack and being folded in zigzag form to conform to the folds of said bags and being bonded to the bags at said folds and to the gusset panels between said inwardly directed fold and said outwardly directed folds, said tapes acting when straightened to straighten out the gussets in said bags and move the front and back walls of the bags apart with the side portions substantially parallel and the front and back walls substantially parallel and perpendicular to said straightened gussets.

CLARENCE W. VOGT.

References Cited in the file of this patent

UNITED STATES PATENTS

| Number | Name | Date |
| --- | --- | --- |
| 205,897 | Parmenter | July 9, 1878 |
| 683,790 | Parmenter | Oct. 1, 1901 |
| 1,209,816 | Dittgen | Dec. 26, 1916 |
| 1,603,362 | Stewart | Oct. 19, 1926 |
| 2,114,623 | Bergstein | Apr. 19, 1938 |
| 2,206,596 | Brown | July 2, 1940 |

FOREIGN PATENTS

| Number | Country | Date |
| --- | --- | --- |
| 60,617 | Netherlands | Jan. 16, 1948 |